United States Patent [19]

Lear

[11] Patent Number: 5,207,334
[45] Date of Patent: May 4, 1993

[54] POT LID ORGANIZER AND STORAGE DEVICE

[76] Inventor: John E. Lear, 624 Sharon Ct., Woodbridge, N.J. 07095

[21] Appl. No.: 766,139

[22] Filed: Sep. 26, 1991

[51] Int. Cl.⁵ .............................................. A47G 19/08
[52] U.S. Cl. ........................................ 211/41; 211/89; 211/184; 248/316.5
[58] Field of Search .................... 248/316.5, 309.1; 211/184, 41, 89

[56] References Cited

U.S. PATENT DOCUMENTS

| | | | |
|---|---|---|---|
| 1,065,000 | 6/1913 | Sarter et al. | 211/41 |
| 1,073,679 | 9/1913 | Haussman | 248/316.5 |
| 1,691,155 | 11/1928 | Howell | 248/316.5 |
| 2,165,654 | 7/1939 | Rosenthal | 211/41 |
| 2,418,919 | 4/1947 | Benson | 211/41 X |
| 2,662,717 | 12/1953 | Johnson | 211/41 X |
| 2,972,414 | 2/1961 | Sipe | 211/13 |
| 3,094,215 | 6/1963 | Sipe | 211/41 X |
| 3,095,092 | 6/1963 | Magarian | 211/89 X |
| 3,171,542 | 3/1965 | Jacobs et al. | 211/184 X |
| 3,465,892 | 9/1969 | Taylor | 211/41 |
| 4,162,013 | 7/1979 | Tucker | 211/184 X |
| 4,592,471 | 6/1986 | Bross | 211/41 |
| 4,768,661 | 9/1988 | Pfeifer | 211/184 |
| 4,776,469 | 10/1988 | Geleziunas | 211/41 |
| 4,850,556 | 7/1989 | Otani et al. | 249/302 X |
| 5,038,945 | 8/1991 | Melkonian | 211/41 X |

Primary Examiner—David M. Purol
Attorney, Agent, or Firm—Abdallah & Muckelroy

[57] ABSTRACT

A pot lid organizer and storage device for selective and stable storage of a plurality of cooking pot lids and the like. The device generally includes a base member and a plurality of pot lid holder modules having pot lid clasps which hold a pot lid by scissors hold grasping engagement of the pot lid handle.

16 Claims, 5 Drawing Sheets

POT LID ORGANIZER AND STORAGE DEVICE

BACKGROUND OF THE INVENTION

The present invention generally relates to organizers for kitchen accessories. More particularly, this invention relates to an organizer and storage device for cooking pot lids and the like.

The clanging of metal pot lids against each other and the kitchen floor reminds us of the difficulties in storing cooking pot lids. Pot lid handles prevent stable stacking of the lids and the varying diameters of pot lids require organized storage so that each can be readily accessible when needed. Thus, there is a need within the art for means to store cooking pot lids in an organized, stable fashion.

Various pot lid organizers and storage devices are shown in the prior art. In U.S. Pat. No. 2,972,414 to Sipe a pot lid holder for a plurality of pot lids is disclosed comprising a plurality of vertically-spaced and horizontally-extending wire frames attached to a vertical support element. A pot lid is selectively received by each wire frame. U.S. Pat. No. 3,094,215 also to Sipe discloses a similar wire frame assembly. U.S. Pat. No. 3,465,892 to Taylor discloses a pot lid rack that slides out like a drawer and includes a plurality of transversely-extending compartments which receive a pot lid. A wall-mountable multiple pot lid storage device is disclosed in U.S. Pat. No. 4,776,469 to Geleziunas which includes respective pairs of arms extending laterally from a vertical wall mount. An adjustable organizer for a plurality of bakeware shown in U.S. Pat. No. 4,592,471 to Bross includes a base member having a plurality of grooves formed by extending ribs. The ribs are disposed in spaced relationship along the length of the base member to each side of a central channel. A plurality of vertical support members selectively engage the respective grooves. A pot lid is held in place within the bakeware organizer by resting a top portion thereof against the vertical support member and by resting a bottom portion thereof against a rib.

In U.S. Pat. No. 4,790,503 to Pohler a hot pot lid and utensil holder is shown. U.S. Pat. No. 4,850,556 to Otani et al. discloses a wire frame pot holder for receipt of a single pot lid that selectively attaches by suction cups to an oven door or the like. U.S. Pat. No. 4,893,771 to Kaneshiro discloses a cooking pot lid stand that includes a base attached to the underside of a cradle. U.S. Pat. No. 4,911,310 to Raishe et al. discloses a holder for a cooking pot lid mountable to a vertical wall and having a slot that receives a pot lid handle. In U.S. Pat. No. 4,936,536 to Meneghello another pot lid holder receiving a pot lid handle and being mountable to a vertical wall is disclosed.

Wire frame organizers for appliances, tools and related accessories are shown in U.S. Pat. No. 4,893,770 and U.S. Pat. No. 4,895,334, both to Bejak et al.

A marketable pot lid holder should be capable of receiving a plurality of pot lids in stable engagement, should be adjustable for receipt of pot lids of varying size, and should retain the pot lids in a manner permitting each pot lid to be quickly and easily accessed. The pot lid organizers and storage devices of the prior art fail to meet one or several of these criteria. Pot lid holders of the prior art that engage a pot lid handle generally hold the pot lid in a meta-stable position and pot lids are unwieldy when being removed from the pot lid holder. Also, the prior art devices are not adjustable to pot lids of different sizes because of stationary pot lid holding means. Thus no suitable unitary module for holding pot lids of different sizes was known in the art prior to this invention.

SUMMARY OF THE INVENTION

The present invention is a pot lid organizer and storage device comprising an elongated base member, L-shaped in cross section, and a plurality of pot lid holder modules comprising novel, pot lid holding means attached to a pot lid holding means support member. The pot lid holding means includes extending scissors hold grasping means which engage the pot lid handle in scissors hold grasping engagement. The pot lid holding means support member is selectively receivable in the base member. In a second embodiment of the present invention, the pot lid holding means support member is slidably and selectively adjustable between detents formed along the length of a second base member.

The pot lid organizer and storage device of the present invention provides greater stored pot lid stability than the devices shown in the prior art. The L-shaped base member provides support in at least two orthogonal sides of the pot lid holder support member. The detents in the second base member serve a similar purpose to retain the pot lid holder support member in an upright position. The present invention also provides a modular construction capable of receiving pot lids of varying sizes and retaining them in stable storage. Additionally, using the pot lid organizer and storage device of the present invention permits quick and easy access to an individual pot lid by the provision of extending scissors hold grasping means.

An object of the present invention is to provide a pot lid organizer and storage device that provides stable storage of cooking pot lids and the like.

Another object of this invention is to provide a pot lid holder module that can hold pot lids of varying size and shape.

A further object of the present invention is to provide a pot lid organizer and storage device that permits quick and easy access to a pot lid stored therein.

It is also an object of the present invention to provide a pot lid organizer and storage device that can be selectively mounted to a cabinet door, floor or the like.

A still further object of the present invention is to provide a pot lid organizer and storage device that can be selectively organized for storing pot lids in various configurations within the base member.

These and other objects and advantages of the present invention will be apparent to those skilled in the art from the following detailed description of preferred embodiments, claims and appended drawings.

DETAILED DESCRIPTION OF PREFERRED EMBODIMENTS

Figure 1:
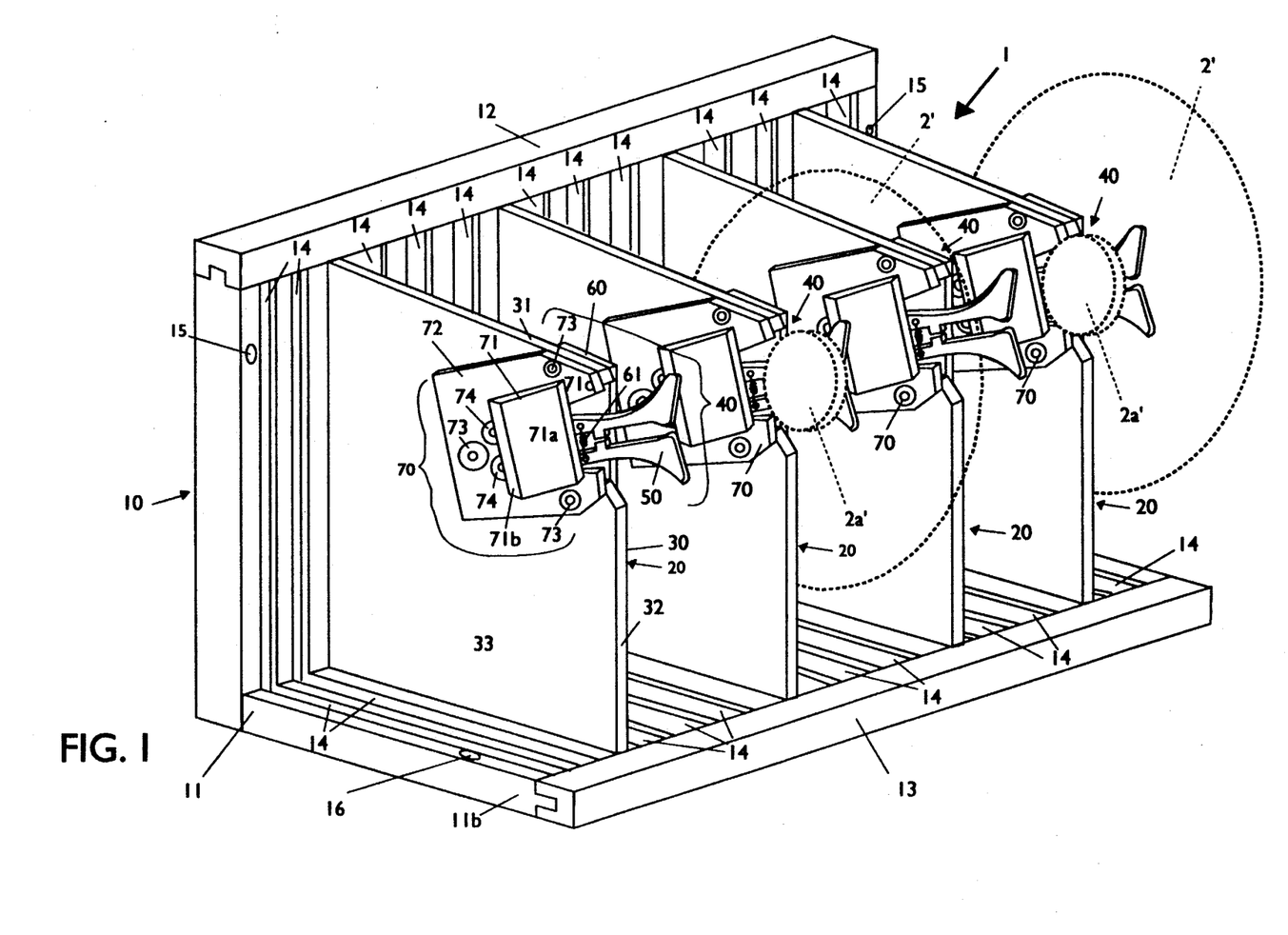
FIG. 1 is a top perspective view of a first preferred embodiment of the pot lid organizer and storage device of the present invention.

FIG. 1 illustrates in a top perspective view a first preferred embodiment of the pot lid organizer and storage device 1 of the present invention. First organizer and storage device 1 generally comprises a first base member 10 and a plurality of first pot lid holder modules 20. The respective first pot lid holder modules 20 are selectively receivable in first base member 10 as hereinafter described in greater detail.

First pot lid holder module 20 includes pot lid holding means support member 30, pot lid holding means 40 and pot lid handle guard 70. Pot lid holding means 40 further comprises scissors hold grasping means 50 and a scissors hold grasping means support member 60. Pot lid holding means 40 and pot lid handle guard 70 are attached to respective sides of the pot lid holding means support member 30 at a forward upper portion thereof. Pot lid holding means 40 provides means to selectively engage the handle 2a or 2a' of a pot lid 2 or 2' in stable grasping engagement. As hereinafter described in greater detail pot lid handle guard 70 is provided to prevent inadvertent loosening or removal of a pot lid 2 or 2' stored in a pot lid holder module 20 when selectively removing a pot lid disposed in an adjacent pot lid holder module 20.

A novel aspect of the present invention is that for right-handed people pot lid holding means 40 can be positioned as shown in FIG. 1 with handle guard 70 disposed to the left side of holding means support member 30 and the grasping means support member 60 disposed to the right side of holding means support member 30 permitting a pot lid 2 disposed in the holding means 40 to be grabbed at the inside of the pot rim by the right hand. For left-handed people first pot lid holder module 20 can be easily reconfigured with handle guard 70 disposed to the right side of holding means support member 30 and the grasping means support member 60 disposed to the left side of holding means support member 30 to permit the inside of the pot rim to be grabbed by the left hand.

Figure 2:
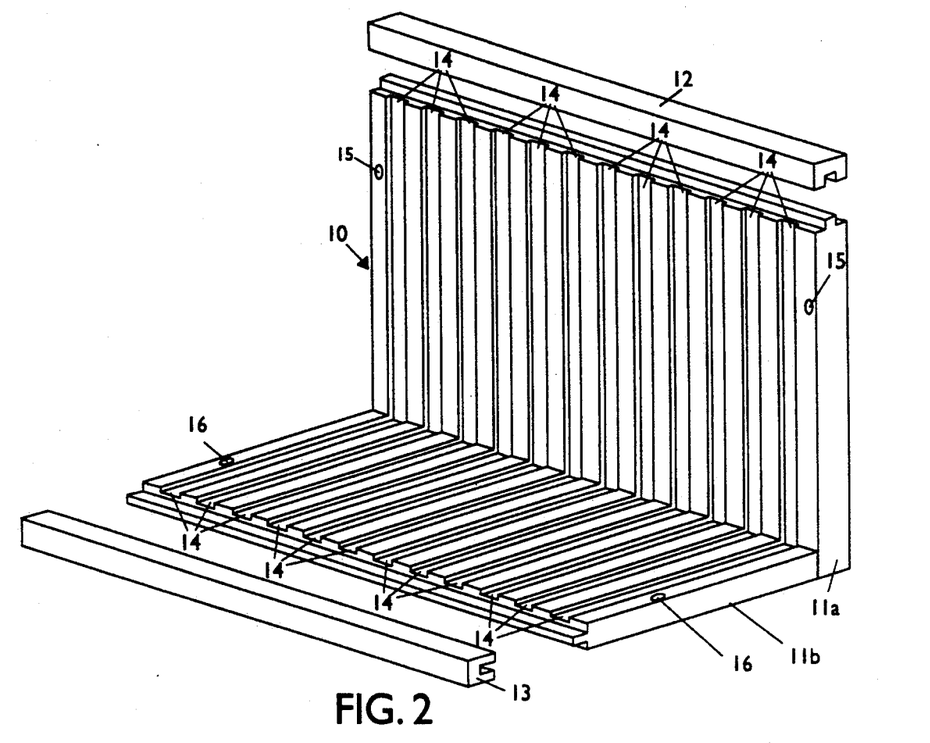
FIG. 2 is an explode top perspective view of the base member of the first pot lid organizer and storage device.

Referring momentarily to FIG. 2 it can be seen that the first preferred base member 10 substantially comprises an elongated central body 11 having an L-shaped lateral cross section, and first and second locking bars 12 and 13 which selectively and respectively engage in tongue and groove attachment the vertical leg 11a and the horizontal leg 11b of the elongated central body 11. A series of lateral slots 14 are formed in the central body 11 along the length thereof by conventional means and coextend between the vertical leg 11a of central body 11 and its horizontal leg 11b. Central body 11 further includes respective vertical mounting screw holes 15 and horizontal mounting screw holes 16 for selective mounting of device 1 to a planar surface.

Returning to FIG. 1 it can be seen that the lateral slots 14 of central body 11 selectively receive the pot lid holding means support member 30 of pot lid holder module 20 in close, bearing engagement to provide upright support of the pot lid holder module 20. The first and second locking bars 12, 13 lock the pot lid holder module 20 in the first base member 10 when attached to the respective legs 11a, 11b of central body 11 by bearing engagement of the respective locking bars 12, 13 against a top wall 31 of the pot lid holding means support member 30 and a forward wall 32 of the holding means support member 30, respectively.

As illustrated in FIG. 1 the pot lid holder module 20 of the present invention can engage pot lids 2 and 2' of varying sizes having differently sized and shaped pot lid handles 2a, 2a'. This is a particular advantage of the present invention over the prior art.

Figure 3:
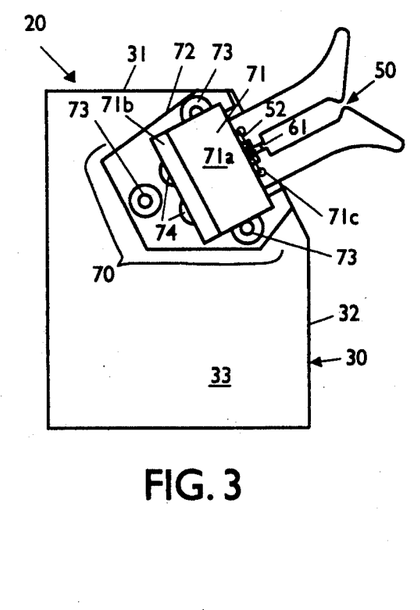
FIG. 3 is a first side elevational view of the pot lid holder module of first preferred embodiment of the present invention.

FIG. 3 illustrates a first side elevational view of first pot lid holder module 20 where it can be seen that pot handle guard 70 is attached to a first side 33 of the pot lid holding means support member 30. When a pot lid, for example pot lid 2, is removed or replaced in a pot lid holder module 20 there is a potential for striking the handle of a pot lid disposed in an adjacent module 20, or the rim of a pot lid disposed to the opposite side of the pot lid being removed. This is particularly true when the modules 20 are placed in close proximity for storage of numerous pot lids. Thus a pot lid stored adjacent to the one being handled can be bumped and knocked from its stored position. Pot handle guard 70 prevents this inadvertent loosening of a pot lid from the pot lid holding means 40 by (1) restraining movement of an adjacently-disposed pot lid when bumped while replacing a pot lid, and by (2) guiding a pot lid that is being removed away from contact with an adjacently-disposed pot lid.

Figure 5:
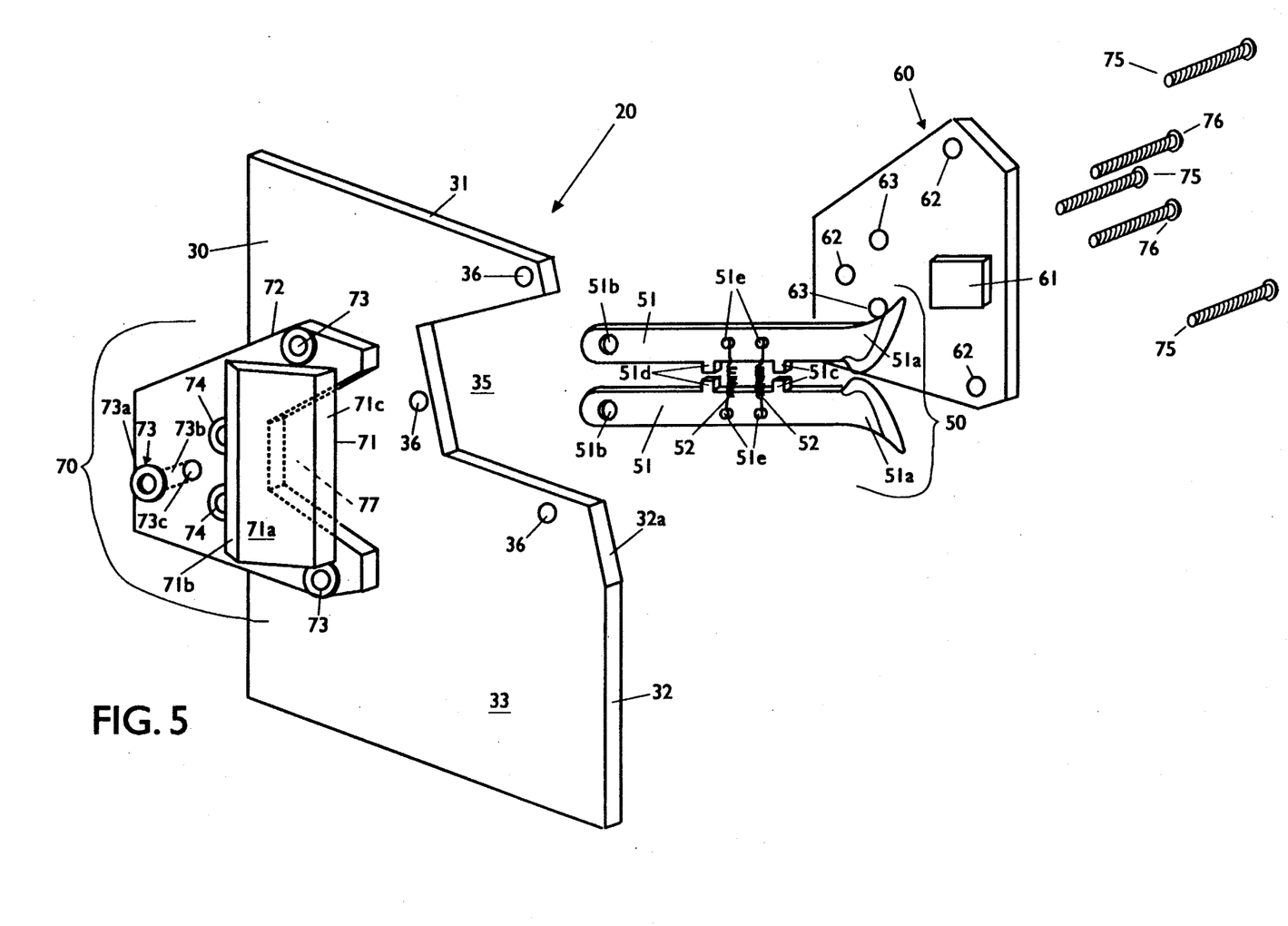
FIG. 5 is an exploded perspective view of the first pot lid holder module.

Pot lid handle guard 70 includes a striking block 71 and a striking block support member 72. Striking block 71 is formed having a flat side wall 71a, a flat, outwardly-sloping rearward edge 71b and a flat forward edge 71c. The rearward edge 71b of striking block 71 facilitates the directing of a pot lid being removed away from the handle of an adjacently-disposed pot lid, and the forward edge 71c of striking block 71 provides bearing support of a pot lid if bumped from the front when replacing a pot lid. Striking block 71 is fixedly attached to striking block support member 72. Striking block support member 72 is formed having a cut away portion 77 at a forward edge thereof to facilitate operation of the scissors hold grasping means 50 as hereinafter described in greater detail (FIG. 5). Striking block support member 72 not only serves to support striking block 71 but in addition provides in part stable support for the scissors hold grasping means 50. Respective first and second screw taps 73 and 74 are disposed in striking block support member 72 for respective attachment of grasping means support member 60 and scissors hold grasping means 50 thereto.

Figure 4:
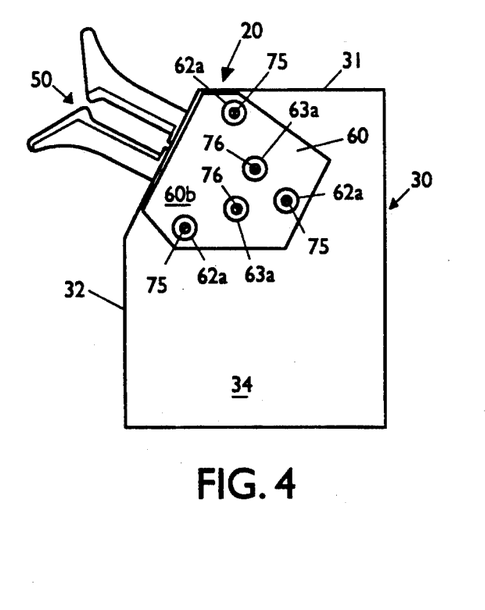
FIG. 4 is a second side elevational view of the pot lid holder module of the first preferred embodiment.

FIG. 4 illustrates a second side elevational view of first pot lid holder module 20 where it can be seen that scissors hold grasping means support member 60 is attached to a second side 34 of the pot lid holding means support member 30. Scissors hold grasping means 50 is disposed in operable engagement between the handle guard 70 and the grasping means support member 60 and extends laterally beyond the forward wall 32 of holding means support member 30 at an upwardly-angled disposition. Respective first and second screws 75 and 76 extend through grasping means support member 60 to respectively engage the first and second screw taps 73 and 74.

Further details of the pot lid holder module 20 of the present invention can be best understood by referring to the exploded perspective illustrated in FIG. 5. The pot lid holding means support member 30 is a substantially flat plate member having a cut away portion 35 formed at an upper forward edge thereof. Below the support member cut away portion 35 the forward edge 32 thereof initially extends to an angled forward edge portion 32a. A plurality of respective handle guard screw holes 36 are formed in the holding means support member 30 about said support member cut away portion 35 for receipt of the respective first screw taps 73 therethrough. A screw tap 73 is shown in phantom lines in FIG. 5 which is typical for first screw tap 73 and second screw tap 74. First screw tap 73 includes a tap head 73a and a tap body 73b, the inner surface 73c of said tap body 73b being threaded for engagement of a first screw 75. Tap body 73b preferably extends marginally beyond the inside surface of the striking block support member 72 and engages the handle guard screw holes 36 of holding means support member 30. When handle guard 70 is attached to the pot lid holding means support member 30 the second screw taps 74 are disposed adjacent to the support member cut away portion 35 enabling pivoting attachment of mounting brackets 51 at the pivot attachment holes 51b.

Scissors hold grasping means 50 comprises a pair of elongated and spring-biased mounting brackets 51 disposed in opposing relationship and operable by pivoting movement of said mounting brackets 51 relative to the holding means support member 30. The respective mounting brackets 51 may be formed of varying length and are formed having an enlarged and vertically-extending feed angled head 51a at its forward end to direct pot lids of varying size between the mounting brackets 51. Mounting brackets 51 further include a pivot attachment hole 51b at the rearward end for pivoting engagement of brackets 51 to the second screw taps 74 in striking block support member 72. Respective vertically-extending first and second detents 51c and 51d define a space therebetween for receipt of a mounting bracket spacer 61 which is fixedly attached to the inside surface 60a of grasping means support member 60.

Mounting bracket spacer 61 is an important element for operation of scissors hold grasping means 50. Spacer 61 facilites positioning of the scissors hold grasping means 50 for receipt of a pot lid and holding of scissors hold grasping means 50 upright when a pot lid is attached thereto. Thus, two functions of the pot lid holder module 20 are thereby solved: access for a pot lid and stability of a pot lid. To these ends spacer 61 retains the respective mounting brackets 51 in slightly displaced relationship to facilitate attachment of a pot lid therebetween, and in addition spacer 61 provides vertical bearing support for the respective mounting brackets 51. Spring mounts 51e extend laterally from mounting brackets 51 between the respective detents 51c, 51d and springs 52 are attached at respective ends to the spring mounts 51e of each mounting bracket 51. Springs 52 in conjunction with the pivoting attachment of mounting brackets 51 at pivot attachment hole 51b provide the scissors hold grasping engagement of the present invention.

From the foregoing it should be understood by one skilled in the art that the first pot lid organizer and storage device 1 heretofore described provides novel and universally adjustable pot lid grasping means. For storage, a pot lid 2 is simply pushed between the mounting brackets 51 whereupon it is automatically grasped and held in stable engagement. The pot lid 2 is simply pulled forward to remove it from the device 1.

Figure 6:
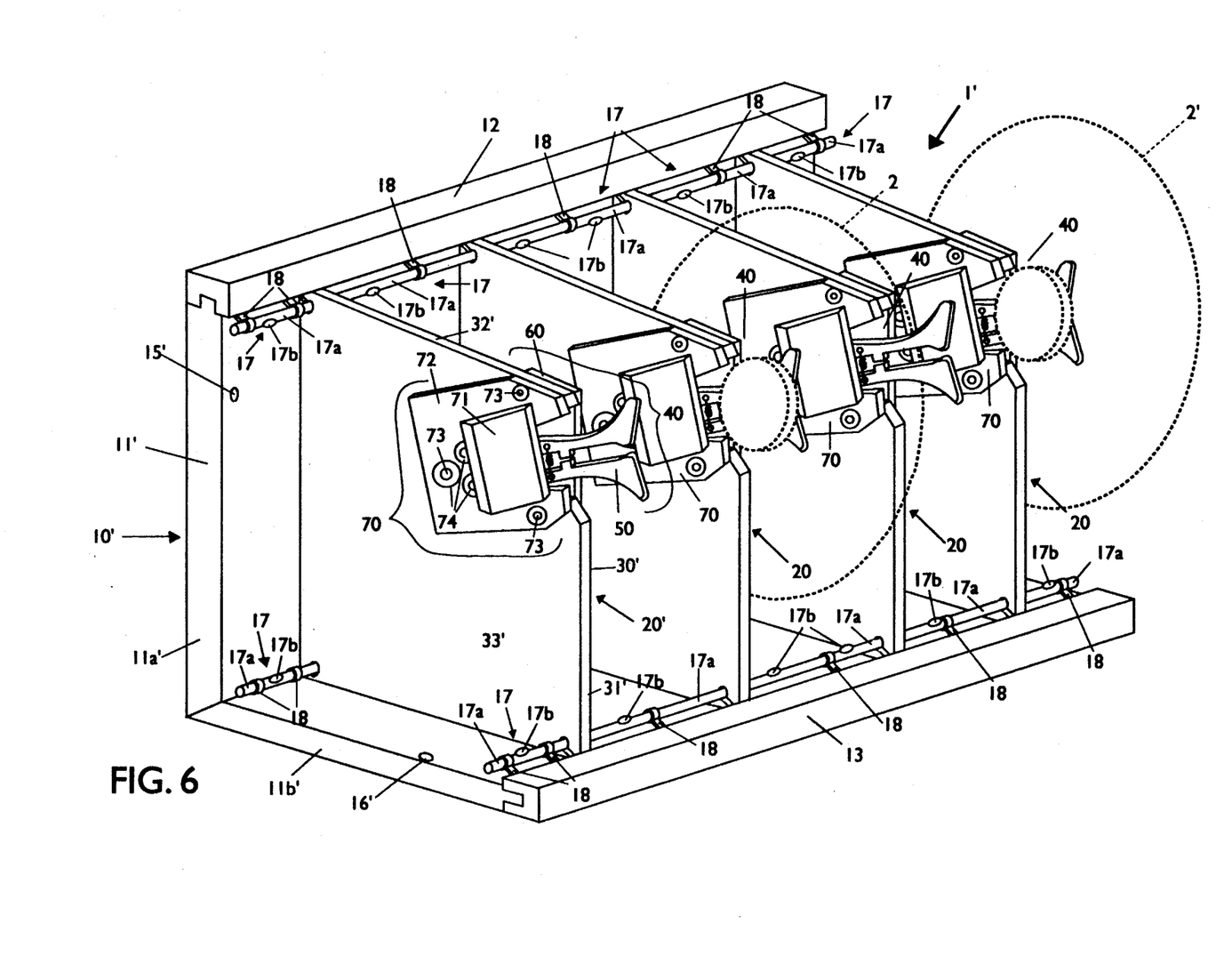
FIG. 6 is a top perspective view of a second preferred embodiment of the present invention.

A second preferred embodiment of a pot lid organizer and storage device 1' is illustrated in FIG. 6. Second pot lid organizer and storage device 1' generally comprises a second base member 10' and a plurality of second pot lid holder modules 20'. The respective second pot lid holder modules 20' are adjustably receivable in second base member 10' as hereinafter described in greater detail.

Second pot lid holder module 20' includes second pot lid holding means support member 30', pot lid holding means 40 and pot lid handle guard 70. Pot lid holding means 40 and pot lid handle guard 70 are constructed and operate in the manner previously described for the first preferred embodiment of the device 1. However, second pot lid holder modules 20' are selectively adjustable along the length of second base member 10' in a different manner.

The second preferred base member 10' substantially comprises an elongated second central body 11' having an L-shaped lateral cross section, and first and second locking bars 12 and 13 which selectively and respectively engage in tongue and groove attachment the vertical leg 11a' and the horizontal leg 11b' of second central body 11'. First, second and third pot lid holder modules support runners 17 are respectively attached to extend along the length of second central body 11' adjacent the first locking bar 12, the second locking bar 13 and the confluence of the vertical and horizontal legs 11a' and 11b' of the second central body 11'. Support runners 17 are attached to second base member 10' by means of runner attachment braces 18 disposed in spaced relationship along the second central body 11' and circumferentially engage support runners 17. Respective second vertical mounting screw holes 15' and second horizontal mounting screw holes 16' are formed in the respective legs 11a' and 11b' of second base member 10' for mounting of the device to a planar surface.

Support runner 17 comprises a runner rod 17a having a plurality of retractable runner detents 17b disposed along the length of runner rod 17a. Runner detents 17b are outwardly biased and selectively retractable by engagement of second pot lid holder modules 20' which slidably engage support runners 17 and are selectively lockable at various positions along support runners 17 by means of the runner detents 17b.

Figures 7, 8, 9:
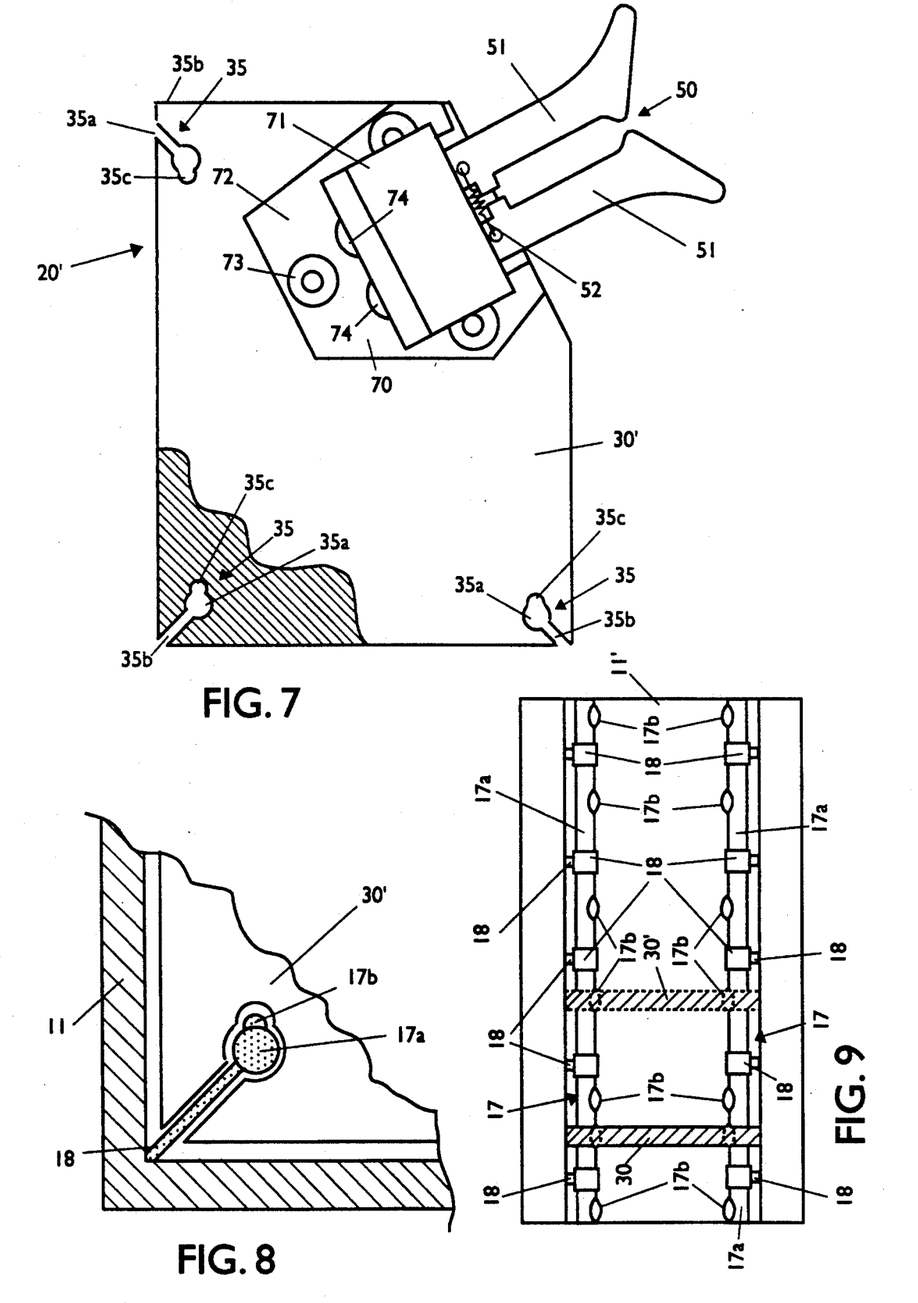
FIG. 7 is a side elevational, partially cross-sectioned view of a second pot lid holder module constructed in accordance with the teachings of the present invention.
FIG. 8 is a fragmented, partially cross-sectioned view of the second pot lid holder module and the second base member.
FIG. 9 is a front plan view of the second preferred embodiment of the pot lid organizer and storage device illustrating the selective arrangement of second modules within the second base member.

As best seen in FIG. 7 the second pot lid holding support means 30' includes support runner receptacles 35 which receive support runners 17 in sliding engagement. Support runner receptacles 35 comprise a receptacle central orifice 35a, a receptacle brace slot 35b extending from the central orifice 35a, and a detent recess 35c also extending from the central orifice 35a. Receptacle brace slot 35b is sufficiently large and disposed at the proper angle to permit runner attachment brace 18 to pass therethrough (FIG. 8). Detent recess 35c selectively receives the detents 17b of support runner 17.

As generally illustrated in FIG. 9 second module 20' can be moved from a first position along support runner 17, as shown by the solid lines, to a second position along support runner 17, as shown by the phantom lines, by sliding the second module 20' until it engages the selected detent 17b.

Various changes, modifications and additions may be made to the preferred embodiments of the present invention without departing from the spirit and scope of the present disclosure. For examples, the outer surface 60b of grasping means support member 60 may be concavely-curved for a portion thereof to facilitate stable engagement of a pot lid 2 in the pot lid holding means 40. Also, a plurality of the pot lid organizer and storage devices may be connected in series to accommodate any storage requirements, or the pot lid organizer and storage device of the present invention may be built into a kitchen cabinet, for examples, without departing from the spirit of this invention. Furthermore, various means now known in the art may be utilized to fixedly attach the device to a planar surface, for example VELCRO, glue, suction cups, etc. Such changes, modifications and additions within a fair reading of the appended claims are intended as part of this disclosure.

Therefore, in view of the foregoing we claim:

1. A pot lid organizer and storage device comprising a base member including an elongated central body having an L-shaped lateral cross section, and first and second locking bars selectively and respectively attachable to a vertical leg of said central body and a horizontal leg of said central body, said central body having a series of lateral slots formed therein; and
a pot lid holder module selectively receivable in a lateral slot of said base member.

2. A pot lid organizer and storage device as in claim 1 wherein said pot lid holder module comprises
   (a) a grasping means support member adjustably and selectively receivable in a lateral slot of said base member, and
   (b) scissors-hold grasping means attached to the grasping means support member.

3. A pot lid organizer and storage device as in claim 2 wherein a handle of said scissors-hold pot lid is selectively receivable in said grasping means.

4. A pot lid organizer and storage device as in claim 2 wherein said scissor-hold grasping means comprises a pair of elongated mounting brackets disposed in opposing relationship and operable by pivoting movement of said mounting brackets relative to said support member.

5. A pot lid organizer and storage device as in claim 2 wherein said scissors-hold grasping means comprises a pair of elongated and spring-biased mounting brackets disposed in opposing relationship and operable by pivoting movement of said mounting brackets relative to said support member, said mounting brackets being pivotally attached at a rearward end thereof to said grasping means support member, said grasping means further including a spring attached at ends thereof to the respective pair of mounting brackets.

6. A pot lid organizer and storage device as in claim 5 wherein said mounting brackets are formed having an enlarged feed angled head at a forward end thereof.

7. A pot lid organizer and storage device comprising a base member including an elongated central body having an L-shaped lateral cross section, and first and second locking bars selectively and respectively attachable to a vertical leg of said central body and a horizontal leg of said central body, said central body having at least one module support runner attached thereto; and
a pot lid holder module selectively receivable in said module support runner.

8. A pot lid organizer and storage device as in claim 7 wherein said pot lid holder module comprises
   (a) a grasping means support member adjustably and selectively receivable on the module support runner of said base member, and
   (b) scissors-hold grasping means attached to the grasping means support member.

9. A pot lid organizer and storage device as in claim 8 wherein a handle of said scissors-hold is selectively receivable in said pot lid grasping means.

10. A pot lid organizer and storage device as in claim 8 wherein said scissors-hold grasping means comprises a pair of elongated mounting brackets disposed in opposing relationship and operable by pivoting movement of said mounting brackets relative to said grasping means support member.

11. A pot lid organizer and storage device as in claim 8 wherein said scissors-hold grasping means comprises elongated and spring-biased mounting brackets disposed in opposing relationship and operable by pivoting movement of said mounting brackets relative to said support member, said mounting brackets being pivotally attached at a rearward end thereof to said support member, said grasping means further including a spring attached at ends thereof to the respective pair of mounting brackets.

12. A pot lid organizer and storage device as in claim 11 wherein said mounting brackets are formed having an enlarged and vertically-extending feed angled head at a forward end thereof.

13. A pot lid holder module comprising
pot lid holding means support member;
pot lid holding means, said holding means being attached to one side of said support member; and
a pot lid handle guard, said handle guard being attached to an opposite side of said support member,
said pot lid holding means comprising scissors-hold grasping means and a grasping means support member.

14. A pot lid holder module comprising
a grasping means support member comprising a substantially rectangular, flat plate member; and
scissors hold grasping means attached to said support member, a handle of a pot lid being selectively receivable in said grasping means, said grasping means comprising a pair of elongated and spring-biased mounting brackets disposed in opposing relationship and operable by pivoting movement of said mounting brackets relative to said support member, said mounting brackets being formed having an enlarged feed angled head at a forward end thereof, said mounting brackets being pivotally attached at a rearward end thereof to said support member, said grasping means further including at least one spring attached at ends thereof to the respective pair of mounting brackets.

15. A pot lid holder module comprising
a pot lid holding means support member comprising a substantially flat plate member having a cut away portion formed at an upper forward edge thereof;
pot lid holding means, said holding means including scissors-hold grasping means and a scissors-hold grasping means support member disposed adjacent to a first side of the grasping means, said support member being fixedly attached to a first side of the plate member having the grasping means disposed in the cut away portion of said holding means; and a pot lid handle guard, said handle guard including a striking block and a striking block support member fixedly attached to a first side of the striking block, said striking block support member being fixedly attached to a second side of the plate member adjacent to the cut away portion of said holding means.

16. A pot lid holder module as in claim 15 and further comprising a pot lid organizer and storage device, said pot lid organizer and storage device comprising a base member including an elongated central body having an L-shaped lateral cross section and first and second locking bars selectively and respectively engaging respective legs of the central body, said central body further including a series of lateral slots formed along the length thereof, said pot lid holding means support member being selectively receivable in said lateral slots.

* * * * *